United States Patent
Zeng et al.

(10) Patent No.: US 11,360,353 B2
(45) Date of Patent: Jun. 14, 2022

(54) SPATIAL LIGHT MODULATOR, FORMATION METHOD THEREOF, AND HOLOGRAPHIC 3D DISPLAY APPARATUS

(71) Applicant: Shanghai Tianma Micro-Electronics Co., Ltd., Shanghai (CN)

(72) Inventors: Yang Zeng, Shanghai (CN); Xiaoyue Su, Shanghai (CN); Shihao Tang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/842,949

(22) Filed: Apr. 8, 2020

(65) Prior Publication Data
US 2021/0200012 A1 Jul. 1, 2021

(30) Foreign Application Priority Data

Dec. 30, 2019 (CN) .......................... 201911395096.5

(51) Int. Cl.
*G02F 1/13363* (2006.01)
*G02F 1/1335* (2006.01)
(Continued)

(52) U.S. Cl.
CPC ........ *G02F 1/13363* (2013.01); *G02F 1/1337* (2013.01); *G02F 1/133528* (2013.01); *G02B 30/22* (2020.01); *G02F 1/0136* (2013.01); *G02F 1/137* (2013.01); *G02F 1/1341* (2013.01); *G02F 1/13471* (2013.01); *G02F 1/133354* (2021.01); *G02F 1/133512* (2013.01); *G02F 1/133514* (2013.01); *G02F 1/133633* (2021.01);
(Continued)

(58) Field of Classification Search
CPC combination set(s) only.
See application file for complete search history.

(56) References Cited

U.S. PATENT DOCUMENTS

| 2009/0079886 | A1* | 3/2009 | Magnusson ....... G02F 1/133528 349/14 |
| 2014/0055695 | A1* | 2/2014 | Miller .................. G02B 5/3083 349/18 |

(Continued)

FOREIGN PATENT DOCUMENTS

| CN | 101287144 A | 10/2008 |
| CN | 102033413 A | 4/2011 |
| CN | 102854630 A | 1/2013 |

*Primary Examiner* — Dung T Nguyen
(74) *Attorney, Agent, or Firm* — Anova Law Group, PLLC

(57) ABSTRACT

A spatial light modulator (SLM) includes a first liquid crystal panel and a second liquid crystal panel that are oppositely configured, and a polarization adjustment part configured between the first liquid crystal panel and the second liquid crystal panel. An alignment direction of the first liquid crystal panel is parallel to an alignment direction of the second liquid crystal panel. The first liquid crystal panel is configured to perform a phase modulation on incident linear-polarized light. The polarization adjustment part is configured to rotate, by a preset angle, a polarization direction of linear-polarized light exited from the first liquid crystal panel. The second liquid crystal panel is configured to adjust a polarization state of linear-polarized light exited from the polarization adjustment part to adjust an amplitude of exited light.

20 Claims, 9 Drawing Sheets

(51) Int. Cl.
  *G02F 1/1337*  (2006.01)
  *G02B 30/22*  (2020.01)
  *G02F 1/1333*  (2006.01)
  *G02F 1/01*  (2006.01)
  *G02F 1/1341*  (2006.01)
  *G02F 1/1343*  (2006.01)
  *G02F 1/1347*  (2006.01)
  *G02F 1/137*  (2006.01)
  *G03H 1/22*  (2006.01)

(52) U.S. Cl.
  CPC .. *G02F 1/133638* (2021.01); *G02F 1/134309* (2013.01); *G03H 1/2205* (2013.01); *G03H 1/2286* (2013.01); *G03H 2001/221* (2013.01); *G03H 2222/13* (2013.01); *G03H 2223/23* (2013.01); *G03H 2225/34* (2013.01)

(56) References Cited

U.S. PATENT DOCUMENTS

2019/0258069 A1*  8/2019  Song .................. G02B 30/26
2020/0117018 A1*  4/2020  Sakai ................. G02B 27/48

* cited by examiner

SPATIAL LIGHT MODULATOR, FORMATION METHOD THEREOF, AND HOLOGRAPHIC 3D DISPLAY APPARATUS

CROSS-REFERENCE TO RELATED APPLICATION

This application claims priority to Chinese Patent Application No. 201911395096.5, filed on Dec. 30, 2019, the entire content of which is incorporated herein by reference.

TECHNICAL FIELD

The present disclosure relates to the technology field of 3D display and, more particularly, to a spatial light modulator (SLM), a formation method thereof, and a holographic 3D display apparatus.

BACKGROUND

Nowadays, electronic apparatus with display functions are widely used. The electronic apparatus brings great convenience, and becomes essential tools in people's daily life and work.

To satisfy 3D display requirements for a display apparatus, holographic 3D display becomes a major development direction in current display field. A holographic 3D display apparatus needs to perform phase and amplitude modulations on coherent light through a spatial light modulator (SLM) to implement the holographic 3D display.

The SLM includes two liquid crystal panels that are oppositely configured. The SLM is configured to perform phase modulation and amplitude modulation on incident linear-polarized light. Existing process for forming the two liquid crystal panels of the SLM is complicated.

SUMMARY

Embodiments of the present disclosure provide a spatial light modulator (SLM) including a first liquid crystal panel and a second liquid crystal panel that are oppositely configured, and a polarization adjustment part configured between the first liquid crystal panel and the second liquid crystal panel. An alignment direction of the first liquid crystal panel is parallel to an alignment direction of the second liquid crystal panel. The first liquid crystal panel is configured to perform a phase modulation on incident linear-polarized light. The polarization adjustment part is configured to rotate, by a preset angle, polarization direction of linear-polarized light exited from the first liquid crystal panel. The second liquid crystal panel is configured to adjust a polarization state of linear-polarized light exited from the polarization adjustment part to adjust an amplitude of exited light.

Embodiments of the present disclosure provide a method of forming a spatial light modulator (SLM) including providing a first liquid crystal panel and a second liquid crystal panel, attaching and fixing the first liquid crystal panel to the second liquid crystal panel, providing a polarizer at a side of the second liquid crystal panel oppositely to the first liquid crystal panel, and configuring the polarizer to adjust an intensity of light exited from the SLM based on light exited from the second liquid crystal panel. A polarization adjustment part is configured between the first liquid crystal panel and the second liquid crystal panel. An alignment direction of the first liquid crystal panel is parallel to an alignment direction of the second liquid crystal panel. The first liquid crystal panel is configured to perform a phase modulation on incident linear-polarized light.

Embodiments of the present disclosure provide a holographic 3D display apparatus including a light source device, a beam expansion and collimation assembly, a spatial light modulator (SLM), a field lens and a liquid crystal grating. The light source device is configured to sequentially exit coherent RGB tri-color light. The beam expansion and collimation assembly is configured to perform expansion and collimation on light exited from the light source device. The SLM is configured to perform a phase modulation and an amplitude modulation on light exited from the beam expansion and collimation assembly. The SLM includes a first liquid crystal panel and a second liquid crystal panel that are oppositely configured, and a polarization adjustment part configured between the first liquid crystal panel and the second liquid crystal panel. An alignment direction of the first liquid crystal panel is parallel to an alignment direction of the second liquid crystal panel. The first liquid crystal panel is configured to perform a phase modulation on incident linear-polarized light. The polarization adjustment part is configured to rotate, by a preset angle, polarization direction of linear-polarized light exited from the first liquid crystal panel. The second liquid crystal panel is configured to adjust a polarization state of linear-polarized light exited from the polarization adjustment part to adjust an amplitude of exited light. The field lens is at least configured to increase an ability of boundary light of light exited from the SLM incident on the liquid crystal gratings. The liquid crystal grating is configured to form a left eye image and a right eye image based on the incident light.

DETAILED DESCRIPTION

Embodiments of the present disclosure are clearly described in conjunction with the accompanying drawings according in the embodiments of the present disclosure. The described embodiments are merely some embodiments of the present disclosure but not all the embodiments. Based on the embodiments of the disclosure, all other embodiments obtained by those of skill in the art without creative efforts are within the scope of the present disclosure.

A 3D display may include a principle of binocular disparity. As the left eye and the right eye each see a different two-dimensional image, a 3D feeling is formed through binocular disparity. However, a principle of a holographic 3D display is stereoscopic display in terms of space. An observer can focus an object individually at any depth. The holographic 3D display can be implemented based on the apparatus shown in FIG. 1.

Figure 1:
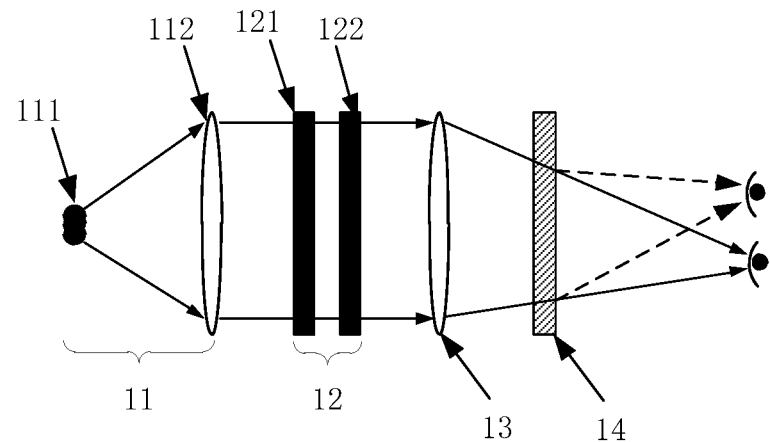
FIG. 1 illustrates a schematic structural diagram of an existing holographic 3D display apparatus.

FIG. 1 illustrates a schematic structural diagram of an existing holographic 3D display apparatus including a backlight 11, a spatial light modulator (SLM) 12, a field lens 13, and a liquid crystal grating 14. The backlight 11 includes a light device 111 and a beam expansion and collimation assembly 112. The backlight 11 is configured to exit sequentially coherent RGB tri-color light. For a holographic 3D display apparatus, a core part is the SLM 12, which includes a liquid crystal panel 121 configured to perform a phase modulation and a liquid crystal panel 122 configured to perform an amplitude modulation. The two liquid crystal panels are attached and fixed with pixel level precision. Incident light passes sequentially through corresponding pixels of the two liquid crystal panels of the SLM 12, and the phase and amplitude modulations are performed on the incident light to facilitate to implementation of the holographic 3D display.

Figure 2:
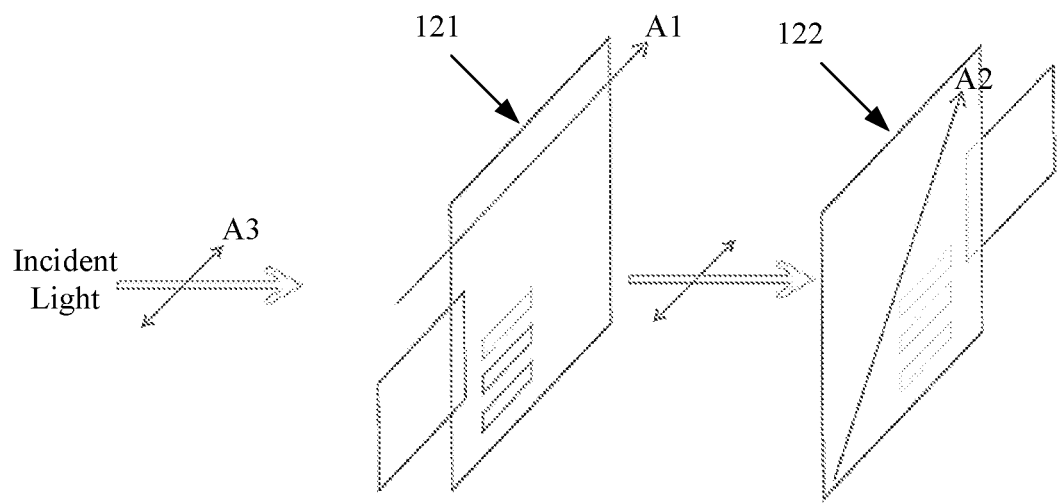
FIG. 2 illustrates a schematic diagram of an alignment principle of two liquid crystal panels of a spatial light modulator (SLM)

FIG. 2 illustrates schematic diagram of alignment principles of the two liquid crystal panels of an SLM. As shown in FIG. 2, to implement the phase and amplitude modulations, in the SLM, an alignment direction A1 of the liquid crystal panel 121 and an alignment direction A2 of the liquid crystal panel 122 may have an angle of 45°. The incident light is linear-polarized light with an alignment direction A3. The alignment A3 is parallel to the alignment direction A1 of the liquid crystal panel 121. After the phase modulation is performed on the incident light through the liquid crystal panel 121, since only an optical path is changed, and a polarization state is not changed, a polarization direction of the linear-polarized light exited through liquid crystal panel 121 and the alignment direction A2 of the liquid crystal panel 122 have an angle 45°. After the amplitude modulation is performed on the linear-polarized light through the liquid crystal panel 122, the polarization state is changed, circular polarized light is formed, and amplitude control can be implemented through a polarizer.

As shown in FIG. 2, the liquid crystal panel 121 and the liquid crystal panel 122 have different alignment directions. Drive electrodes in the liquid crystal panel adapt to the alignment directions. Therefore, the process of forming the two liquid crystal panels of the SLM 12 is complicated. Difficulties in design and formation of the SLM are enlarged.

According to various embodiments of the present disclosure, a polarization adjustment part is configured between two liquid crystal panels of a spatial light modulator (SLM). While the alignment directions of the two liquid crystal panels of the SLM are parallel, the phase modulation and amplitude modulation can be implemented on the incident linear-polarized light. The formation process of the SLM is simplified, and the design and formation difficulties of the SLM are reduced.

To make the above-mentioned purposes, features, and advantages of the present disclosure more comprehensive, the present disclosure is further described in detail in conjunction with the drawings and specific embodiments as follows.

Figure 3:
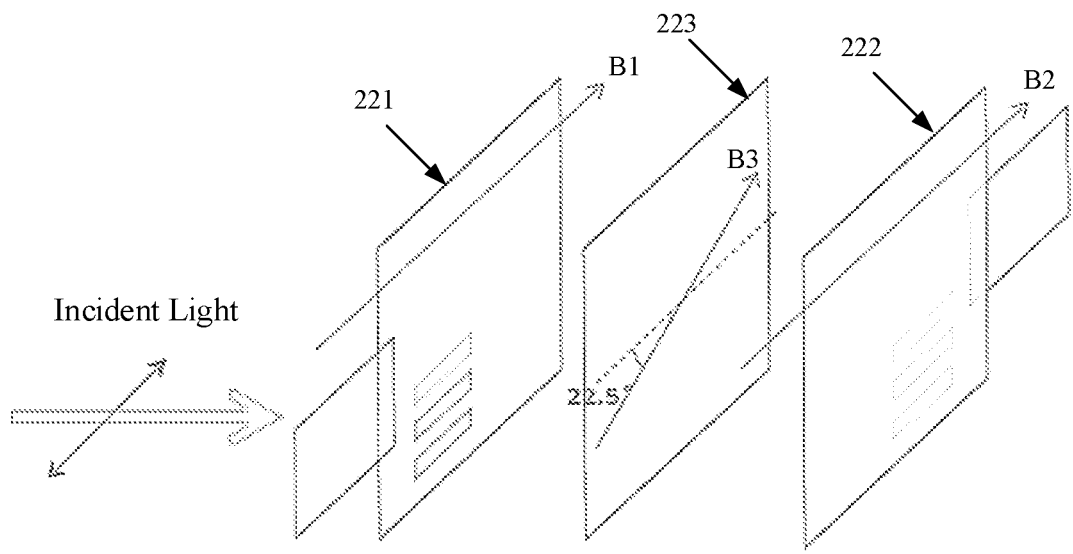
FIG. 3 illustrates a schematic structural diagram of an exemplary spatial light modulator (SLM) according to some embodiments of the present disclosure.

FIG. 3 illustrates a schematic structural diagram of an exemplary SLM according to some embodiments of the present disclosure. The SLM includes a first liquid crystal panel 221 and a second liquid crystal panel 222 that are oppositely configured, and a polarization adjustment part 223 configured between the first liquid crystal panel 221 and the second liquid crystal panel 222. An alignment direction B1 of the first liquid crystal panel 221 is parallel to an alignment direction B2 of the second liquid crystal panel 222. The first liquid crystal panel 221 includes two alignment layers. The alignment direction B1 can be understood as a direction of one of the alignment layers of the first liquid crystal panel 221. The second liquid crystal panel 222 includes two alignment layers. The alignment direction B2 can be understood as a direction of one of the alignment layers of the second liquid crystal panel 222. The first liquid crystal panel 221 is configured to perform the phase modulation on the incident linear-polarized light. The polarization adjustment part 223 is configured to rotate, by a preset angle, a polarized direction of the linear-polarized light exited through the first liquid crystal panel 221 and maintain linear polarization. The second liquid crystal panel 222 is configured to adjust the polarization of the linear-polarized light exited from the polarization adjustment part 223 to perform the amplitude modulation of the incident light.

In the SLM, the alignment direction B1 of the first liquid crystal panel 221 configured to perform the phase modulation is parallel to the polarization direction of the incident linear-polarized light, such that the first liquid crystal panel 221 changes the optical path of the incident linear-polarized light and adjusts the phase of the linear-polarized light, but does not change the polarization of the linear-polarized light. The alignment direction B2 of the second liquid crystal panel 222 is required to have a preset angle with the polarization direction of the incident linear-polarized light, and the angle is usually 45°. Therefore, after the linear-polarized light passes the second liquid crystal panel 222, the polarization is changed, the circular polarized light is formed, and the exited circular polarized light implements the phase modulation through an adapted polarizer.

In the SLM mentioned in embodiments of the present disclosure, the polarization adjustment part 223 is configured between the first liquid crystal panel 221 and the second liquid crystal panel 222. The polarization adjustment part 223 is configured to change the polarization direction of the exited linear-polarized light of the first liquid crystal panel 221. Therefore, when the alignment direction B1 of the first liquid crystal panel 221 is parallel to the alignment direction B2 of the second liquid crystal panel 222, the polarization adjustment part 223 changes the polarization direction of the exited linear-polarized light of the first liquid crystal panel 221. As such, the polarization direction of the exited linear-polarized light of the first liquid crystal panel 221 rotates with a preset angle and then is incident on the second liquid crystal panel 222. The preset angle may be 45°. That is, the polarization direction of the incident linear-polarized light incident on the second liquid crystal panel 222 and the alignment direction B2 of the second liquid crystal panel 222 have the preset angle to satisfy a condition of the amplitude modulation. Therefore, when the alignment directions of the two liquid crystal panels are parallel to each other, the phase modulation and the amplitude modulation can sequentially be performed on the incident linear-polarized light. The formation process of the SLM is simplified, and the design and formation difficulties of the SLM are reduced.

In some embodiments, as shown in FIG. 3, the polarization adjustment part 223 is a half-wave plate. An optical axis direction of the half-wave plate and the polarization direction of the linear-polarized light exited from the first liquid crystal panel 221 form an angle of 22.5°. The half-wave plate is configured to rotate, by 45°, the polarization direction of the linear-polarized light exited from the first liquid crystal panel 221. The rotated linear-polarized light is then transmitted to the second liquid crystal panel 222. When the alignment directions of the two liquid crystal panels are configured in parallel, after the phase modulation is performed on the linear-polarized light, whose polarization direction is parallel to the first liquid crystal panel 221, through the first liquid crystal panel 221, the polarization direction of the exited linear-polarized light is not changed. The polarization direction of the linear-polarized light is then rotated by 45° through the half-wave plate. Therefore, the polarization direction of the linear-polarized light incident on the second liquid crystal panel 222 and the alignment direction B2 of the second liquid crystal panel 222 form the angle of 45°, such that the circular polarized light is formed through the second liquid crystal panel 222, and the amplitude modulation is implemented through the adapted polarizer.

Figure 4:
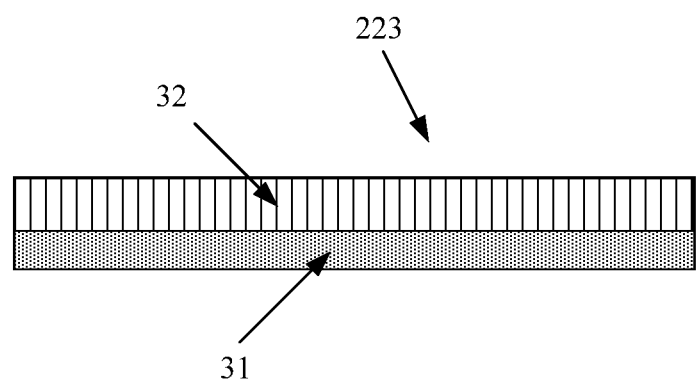
FIG. 4 illustrates a schematic structural diagram of an exemplary polarization adjustment part according to some embodiments of the present disclosure.

As shown in FIG. 4, FIG. 4 illustrates a schematic structural diagram of an exemplary polarization adjustment part according to some embodiments of the present disclosure. The polarization adjustment part 223 shown in FIG. 4 is a half-wave plate. The half-wave plate at least includes a substrate material layer 31 and a polarizing film 32. The substrate material layer 31 and the polarizing film 32 are oppositely configured. Two opposite surfaces of the half-wave plate (such as the surface of the substrate material layer 31 opposite to the polarizing film 32 and the surface of the polarizing film 32 opposite to the substrate material layer 31) are attached and fixed to the first liquid crystal panel 221 and the second liquid crystal panel 222, respectively. The two opposite surfaces of the half-wave plate can be attached and fixed to the corresponding liquid crystal panels through corresponding optical adhesive layers, respectively. The substrate material layer 31 of the half-wave plate is configured facing the first liquid crystal panel 221, and the polarizing film 32 of the half-wave plate is configured facing the second liquid crystal panel 222. In some embodiments, the substrate material layer 31 of the half-wave plate is configured facing to the second liquid crystal panel 222, and the polarizing film 32 of the half-wave plate is configured facing the first liquid crystal panel 221. For this method, the half-wave plate can be prepared individually. The half-wave plate is then attached and fixed to the two liquid crystal panels with the parallel alignment directions to form an SLM. The formation process is simplified, and the cost is reduced.

The substrate material layer 31 may a triacetate (TAC) film or other transparent film layers. The polarizing film 32 may be a polyvinyl alcohol (PVA) film having a polarizing characteristic. For example, the PVA film may have high transmittance and high polarizing characteristics through a wet stretching process, such that the polarizing characteristic of the half-wave plate is realized.

The half-wave plate may further include a first protective layer configured between the polarizing film 32 and the substrate material layer 31. The first protective layer may be a single layer film or a laminated structure of a plurality of different material layers. The first protective layer is a transparent layer, which is configured to balance stress between the polarizing film 32 and the substrate material layer 31 and prevent the polarizing film 32 from shrinking to affect a polarizing performance, and/or is configured to prevent water vapor from corroding the polarizing film 32. The half-wave plate may further include a second protective layer configured on a side of the polarizing film 32 away from the substrate material layer 31. The second protective layer may be a single-layer film or a laminate structure of a plurality of difference material layers. The second protective layer is a transparent layer, which is configured to implement one of following functions such as to prevent the polarizing film 32 from damaging, to prevent water vapor from corroding the polarizing film 32, to prevent dirt, to prevent static electricity, etc.

In other embodiments, the half-wave plate may further be a liquid crystal wave plate, which can directly reuse the first liquid crystal panel 221 or the second liquid crystal panel 222 as a substrate of the liquid crystal wave plate without providing an extra substrate, such that the SLM is relative thin. The SLM may be as shown in FIG. 5 or FIG. 6.

Figure 5:
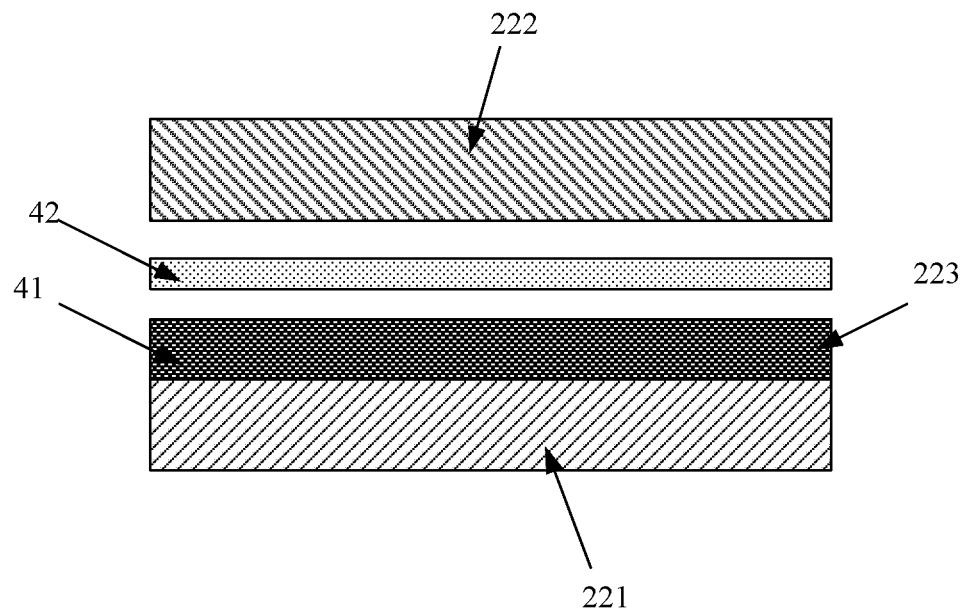
FIG. 5 illustrates a schematic structural diagram of another exemplary SLM according to some embodiments of the present disclosure.

FIG. 5 illustrates a schematic structural diagram of another exemplary SLM according to some embodiments of the present disclosure. In the SLM shown in FIG. 5, the polarization adjustment part 223 is a liquid crystal wave plate 41. The liquid crystal wave plate is a half-wave plate. The liquid crystal wave plate 41 is coated on a surface of the first liquid crystal panel 221, which is attached and fixed to the second liquid crystal panel 222. The liquid crystal wave plate 41 may be attached and fixed to the second liquid crystal panel 222 through an optical adhesive layer 42. This method directly reuses the first liquid crystal panel 221 as a substrate and coats a liquid crystal layer on the surface of the first liquid crystal panel 221 to form the half-wave plate without providing an extra substrate, such that thickness of the SLM is relatively thin.

Figure 6:
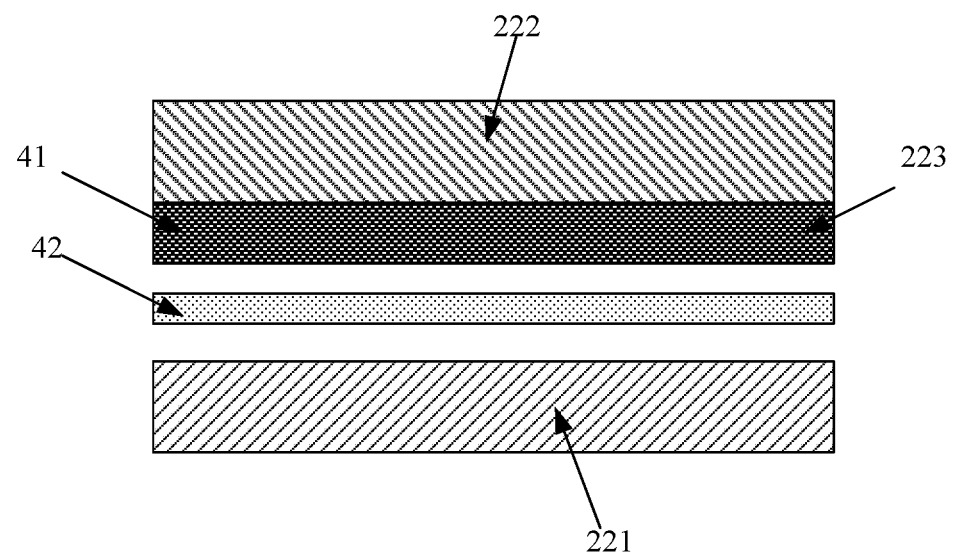
FIG. 6 illustrates a schematic structural diagram of another exemplary SLM according to some embodiments of the present disclosure.

FIG. 6 illustrates a schematic structural diagram of another exemplary SLM according to some embodiments of the present disclosure. As shown in FIG. 6, the difference from the method in FIG. 5 is that the liquid crystal wave plate 41 is coated on a surface of the second liquid crystal panel 222, which is attached and fixed to the first liquid crystal panel 221. The liquid crystal wave plate 41 may be attached and fixed to the first liquid crystal panel 221 using an optical adhesive layer 42. This method directly reuses the second liquid crystal panel 222 as a substrate. A liquid crystal layer is coated on the surface of the second liquid crystal panel 222 to form the half-wave plate without providing an extra substrate, so that the thickness of the SLM is relatively thin.

In the above-mentioned various embodiments, taking the polarization adjustment part 223 as the half-wave plate as an example for explanation. In other embodiments, the polarization adjustment part 223 may further includes a first quarter-wave plate and a second quarter-wave plate. The first quarter-wave plate and the second quarter-wave plate work together to implement a same polarization adjustment function as a half-wave plate, such that the polarization direction of the linear-polarized light exited from the first liquid crystal panel 221 is rotated by 45°. At this point, the structure of the polarization adjustment part 223 can be shown in FIG. 7 to FIG. 9.

Figure 7:
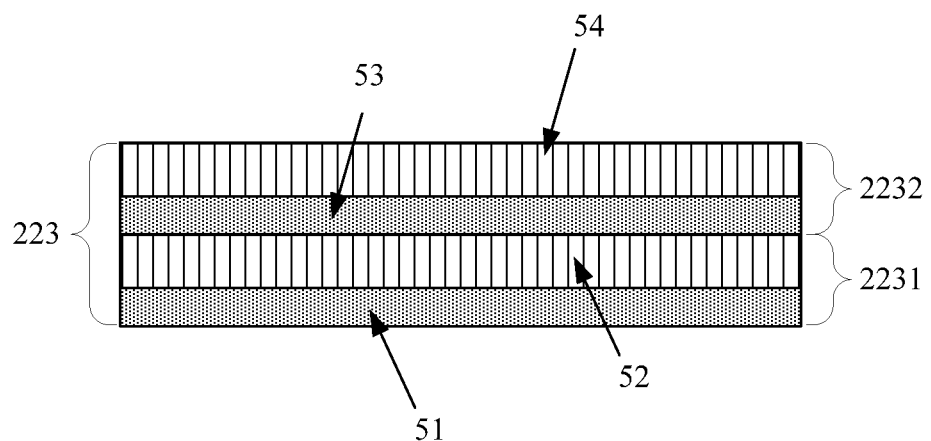
FIG. 7 illustrates a schematic structural diagram of another exemplary polarization adjustment part according to some embodiments of the present disclosure.

FIG. 7 illustrates a schematic diagram of another exemplary polarization adjustment part according to some embodiments of the present disclosure. As shown in FIG. 7, the polarization adjustment part 223 includes a first quarter-wave plate 2231 and a second quarter-wave plate 2232.

The first quarter-wave plate 2231 includes a first polarizing film 52 and a first substrate 51, and the first polarizing film 52 is configured oppositely to the first substrate 51. Similar as an implementation method of a half-wave plate, a protective layer can be configured between the first polarizing film 52 and the first substrate 51, and/or the protective layer is configured at a side of the first polarizing film 52 away from to the first substrate 51. The protective layer has the same implementation method and function as the protective layer solution of the above-mentioned half-wave plate, which is not repeated here.

The second quarter-wave plate 2232 includes a second polarizing film 54 and a second substrate 53, and the second polarizing film 54 is configured oppositely to the second substrate 53. Similar as an implementation method of a half-wave plate, a protective layer can be configured between the second polarizing film 54 and the second substrate 53, and/or the protective layer is configured at a side of the second polarizing film 54 away from the second substrate 53. The protective layer has the same implementation method and function as the protective layer solution of the above-mentioned half-wave plate, which is not repeated here.

The first quarter-wave plate 2231 is configured oppositely to the second quarter-wave plate 2232 and are attached and fixed to the second quarter-wave plate 2232. The two quarter-wave plates may be attached and fixed using an optical adhesive. FIG. 7 does not show the optical adhesive. The two quarter-wave plates may be attached and fixed by facing the substrates of the two quarter-wave plates to each other. The two quarter-wave plates may also be attached and fixed by configuring the polarizing films of the two quarter-wave plates oppositely, or may be attached and fixed by facing toward a substrate of a quarter-wave plate to a polarizing film of the other quarter-wave plate.

The two quarter-wave plates can be prepared separately. After the first liquid crystal panel 221 and the second liquid crystal panel 222 are attached and fixed to the two quarter-wave plates, respectively, and attached and fixed oppositely, or the two quarter-wave plates are attached and fixed at first and then are attached and fixed with the first liquid crystal panel 221 and the second liquid crystal panel 222, respectively.

As shown in FIG. 7, the two separately prepared quarter-wave plates can be prepared separately to implement the same polarization adjustment function of the half-wave plate, such that the polarization direction of the linear-polarized light exited from the first liquid crystal panel 221 is rotated by 45°. The two liquid crystal panels with the parallel alignment directions are used to form an SLM, which sequentially performs a phase modulation and an amplitude modulation on the linear-polarized light to implement a holographic 3D display.

Figure 8:
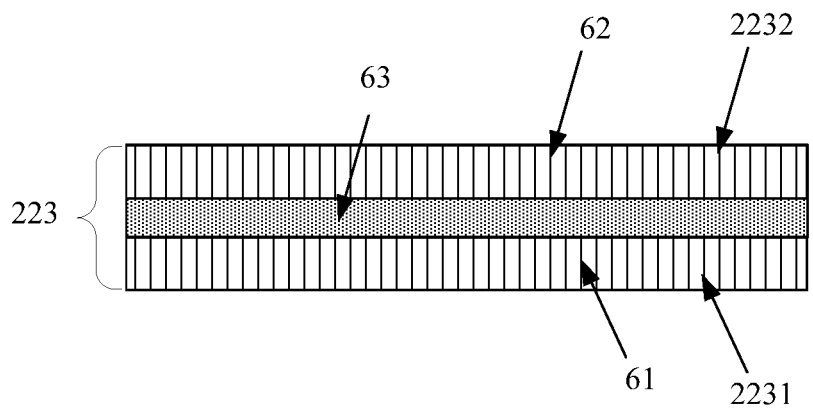
FIG. 8 illustrates a schematic structural diagram of another exemplary polarization adjustment part according to some embodiments of the present disclosure.

FIG. 8 illustrates a schematic structural diagram of another exemplary polarization adjustment part according to some embodiments of the present disclosure. As shown in FIG. 8, the polarization adjustment part 223 includes the first quarter-wave plate 2231 and the second quarter-wave plate 2232. In this method, the first quarter-wave plate 2231 includes a first polarizing film 61. The second quarter-wave plate includes a second polarizing film 62. The first polarizing film 61 and the second polarizing film 62 are located at two opposite surfaces of a same substrate 63.

As shown in FIG. 8, the two integrated quarter-wave plates are prepared by using the same substrate 63. The thickness of the polarization adjustment part 223 is relatively thin, such that an SLM has a relative thin thickness. This method can prepare the two integrated quarter-wave plates separately and then attached and fixed two sides of the two integrated quarter-wave plates to the first liquid crystal panel 221 and the second liquid crystal panel 222, respectively.

Figure 9:
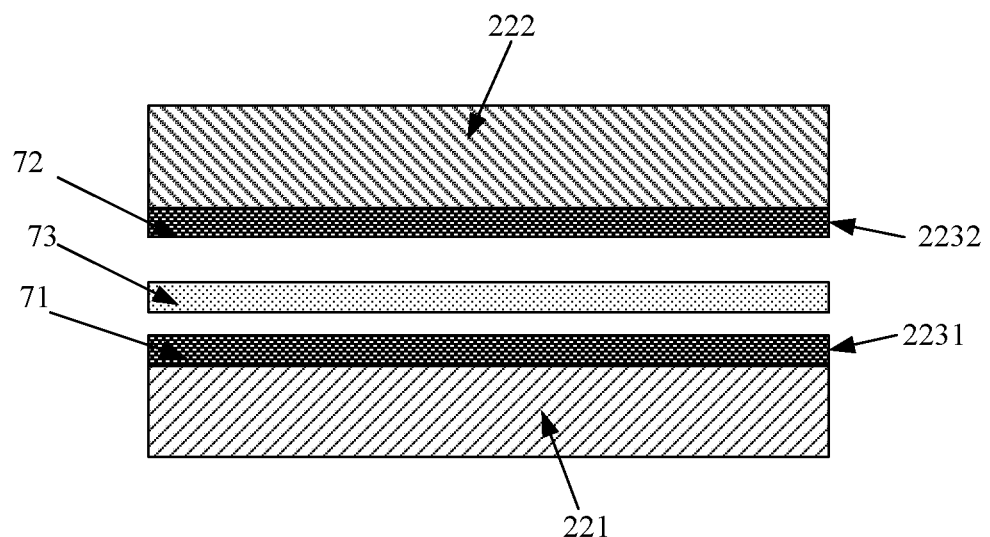
FIG. 9 illustrates a schematic structural diagram of another exemplary SLM according to some embodiments of the present disclosure.

As shown in FIG. 9, FIG. 9 illustrates a schematic structural diagram of another exemplary SLM according to some embodiments of the present disclosure. As shown of FIG. 9, the polarization adjustment part 223 includes a first quarter-wave plate 2231 and a second quarter-wave plate 2232. The first quarter-wave plate 2231 is a first liquid crystal wave plate 71, and the second quarter-wave plate 2232 is a second liquid crystal wave plate 72. The first liquid crystal wave plate 71 is coated on a surface of the first liquid crystal panel 221. The second liquid crystal wave plate 72 is coated on a surface of the second liquid crystal panel 222. The first liquid crystal wave plate 71 and the second liquid crystal wave plate 72 are attached and fixed oppositely. The two liquid crystal wave plates may be attached and fixed by using the optical adhesive 73.

As shown in FIG. 9, the two liquid crystal wave plates can be prepared as quarter-wave plates to implement a same polarization adjustment function of a half-wave plate, such that the polarization direction of the linear-polarized light exited from the first liquid crystal panel 221 is rotated by 45°. The two liquid crystal panels with the two parallel alignment directions are used to form an SLM, which sequentially performs a phase modulation and an amplitude modulation on the linear-polarized light to implement a holographic 3D display. The method directly reuses the two liquid crystal panels as substrates of the two liquid crystal wave plates without configuring separately substrates for the liquid crystal wave plates, such that the thickness of the SLM is relatively thin.

Figure 10:
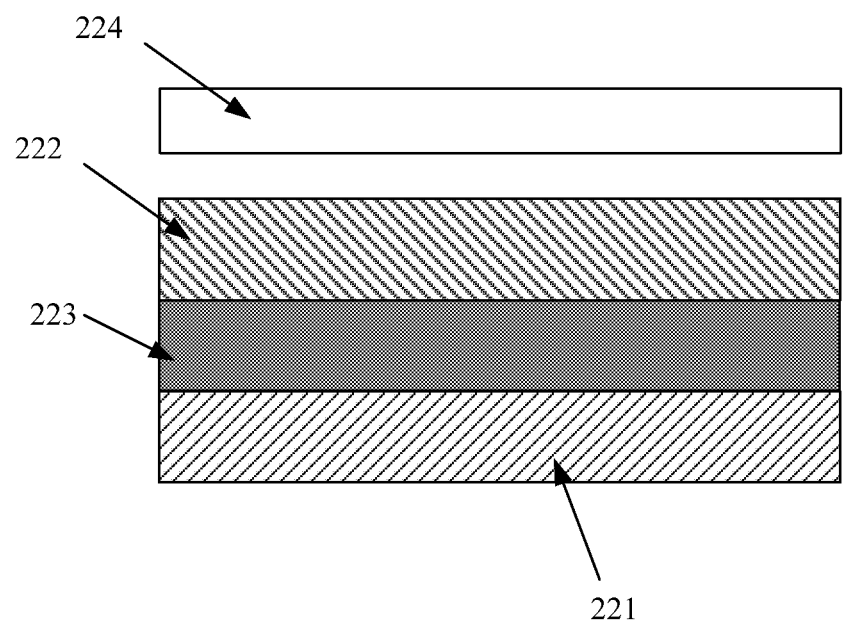
FIG. 10 illustrates a schematic structural diagram of another exemplary SLM according to some embodiments of the present disclosure.

FIG. 10 illustrates a schematic structural diagram of another exemplary SLM according to some embodiments of the present disclosure. In the embodiments, a polarizer 224 is configured at a side of the second liquid crystal panel 222 away from the first liquid crystal panel 221. The polarizer 224 is configured to adjust an intensity of exited light of the SLM based on light exited from the second liquid crystal panel 222. The polarizer 224 can be directly attached and fixed to a surface of the second liquid crystal panel 222 or configured to be attached and fixed to a field lens and liquid crystal gratings of a subsequent light path after the SLM. An implementation method of the polarization adjustment part 223 may be made referred to the above-mentioned embodiments, which is not repeated here. The polarizer 224 is directly attached and fixed to a second liquid crystal surface of the SLM or to a surface of other components after the SLM, which can improve an integration degree.

The linear-polarized light incident in the SLM is coherent RGB tri-color light exited from a light source device sequentially. The polarization adjustment part 223 has a wide-band characteristic. An adjustment wave band of the polarization adjustment part 223 covers at least an RGB tri-color light band, to facilitate a phase modulation and an amplitude modulation of tri-color backlight to realize holographic 3D display.

Figure 11:
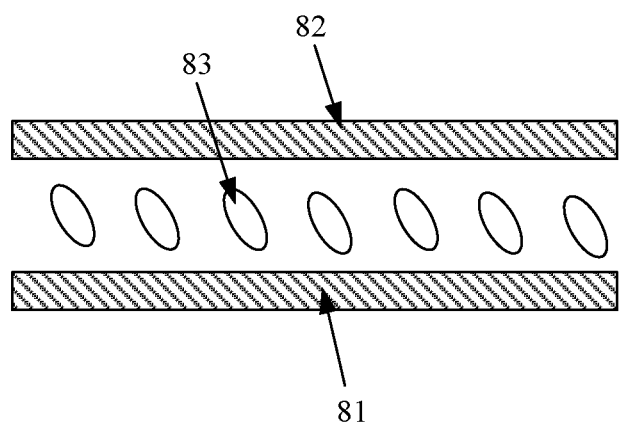
FIG. 11 illustrates a schematic structural diagram of an exemplary liquid crystal panel according to some embodiments of the present disclosure.

FIG. 11 illustrates a schematic structural diagram of an exemplary liquid crystal panel according to some embodiments of the present disclosure. In the SLM of embodiments of the present disclosure, the structures of the first liquid crystal panel 221 and the second liquid crystal panel 222 are shown in FIG. 11.

As shown in FIG. 11, each of the first liquid crystal panel 221 and the second liquid crystal panel 222 includes a first alignment layer 81, liquid crystal layer 83, and second alignment layer 82, sequentially stacked over each other. In a same liquid crystal panel, alignment directions of the first alignment layers 81 and the second alignment layers 82 are antiparallel to each other and are parallel to a first direction. The first direction is parallel to the alignment direction B1 and the alignment direction B2.

Figure 12:
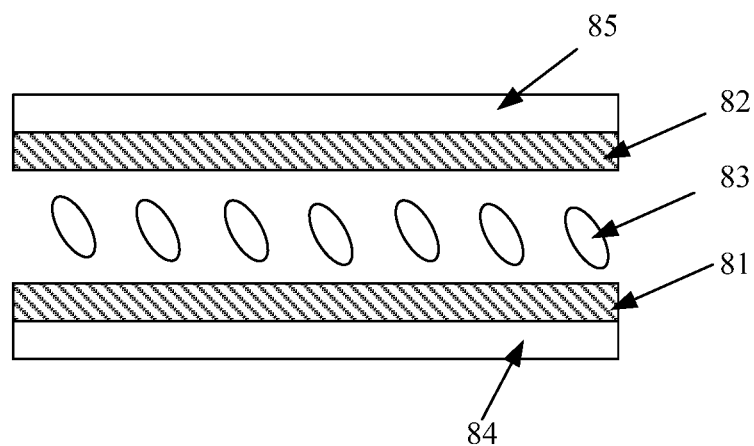
FIG. 12 illustrates a schematic structural diagram of another exemplary liquid crystal panel according to some embodiments of the present disclosure.

FIG. 12 illustrates a schematic structural diagram of another exemplary liquid crystal panel according to some embodiments of the present disclosure. As shown in FIG. 12 based on the method shown in FIG. 11, a same liquid crystal panel of the SLM further includes a first electrode 84 and a second electrode 85. The first electrode 84, the first alignment layer 81, the liquid crystal layer 83, the second alignment layer 82, and the second electrode 85 are sequentially stacked over each other. The first electrode 84 and the second electrode 85 are configured to form an electric field perpendicular to the liquid crystal layer 83. The electric field is along a second direction. The inversion plane of the liquid crystal molecules in the liquid crystal layer is parallel to the first direction and the second direction.

The first liquid crystal panel 221 and the second liquid crystal panel 222 can cause the liquid crystal molecules to inverse at a predetermined plane. An inversion degree of the liquid crystal molecules is controlled to implement the phase modulation or amplitude modulation by controlling voltage signals of the two opposite electrodes of the two liquid crystal panels. Principles for adjusting rotations of the liquid crystal molecules of the two liquid crystal panels are shown in FIG. 13.

Figure 13:
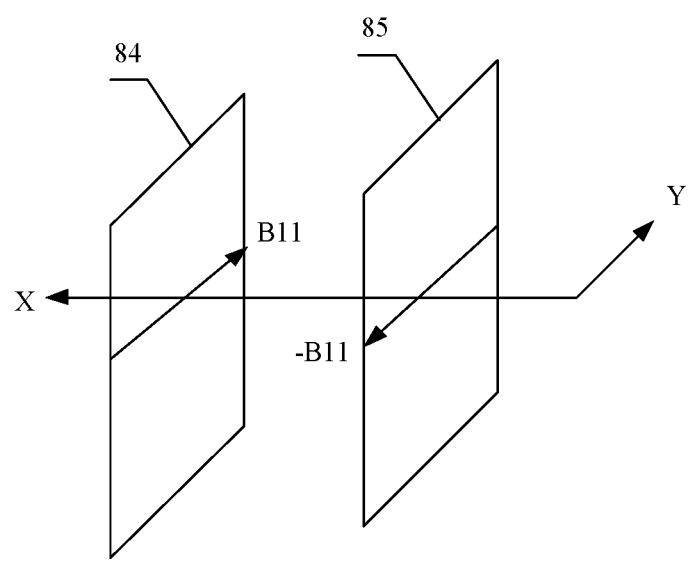
FIG. 13 illustrates a schematic diagram of principles of liquid crystal molecular inversion controlled by an exemplary liquid crystal panel according to some embodiments of the present disclosure.

FIG. 13 illustrates a schematic diagram of principles of liquid crystal molecular inversion controlled by an exemplary liquid crystal panel according to some embodiments of the present disclosure. The first electrode 84 is configured oppositely to the second electrode 85. A liquid crystal layer (not shown in FIG. 13) is located between the two electrodes. The alignment directions of two alignment layers (not shown in FIG. 13) at both sides of the liquid crystal layer are B11 and −B11, respectively. The alignment directions of the two alignment layers are antiparallel to each other and are parallel to a first direction Y. Electrode patterns of the first electrode 84 and the second electrode 85 can be set based on requirements. The two electrodes form an electric field perpendicular to the liquid crystal layer. An electric field direction is parallel to a second direction X. The first direction Y and the second direction X define a plane XY. The liquid crystal molecules of the liquid crystal layer inverse in parallel to the plane XY. Long axes of the liquid crystal molecules are parallel to the plane XY.

In the SLM according to embodiments of the present disclosure, the polarization adjustment part 223 is provided to make the alignment directions of the two liquid crystal panels to be antiparallel to each other, so that inversion modes of the liquid crystal molecules in the two liquid crystal panels are the same. The liquid crystal panels with the same liquid crystal inversion mode can implement the phase modulation and the amplitude modulation, and the liquid crystal panels with different inversion modes are not needed, such that the control method and the formation process of the SLM are simplified.

Figure 14:
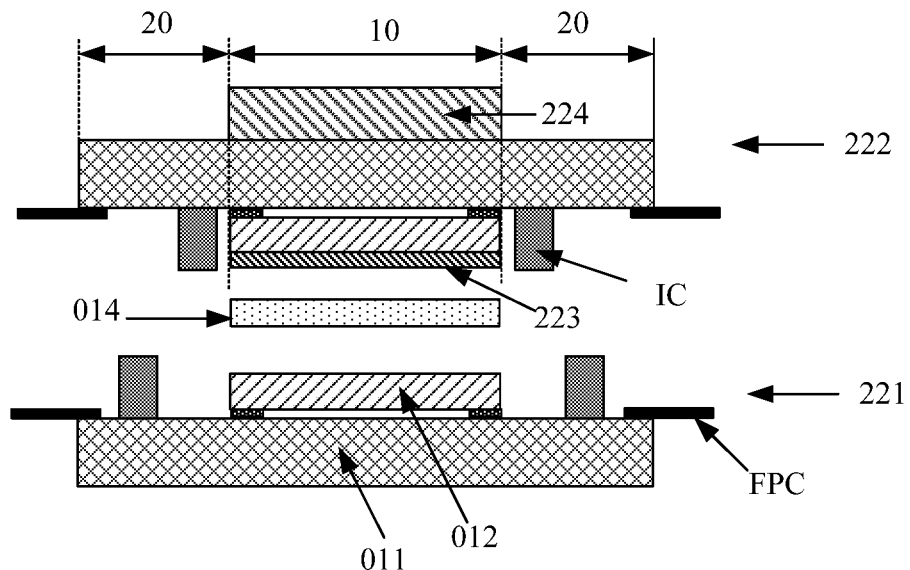
FIG. 14 illustrates a schematic structural diagram of another exemplary SLM according to some embodiments of the present disclosure.

FIG. 14 illustrates a schematic structural diagram of another exemplary SLM according to some embodiments of the present disclosure. As the above-mentioned in the embodiments, the SLM shown in FIG. 14 includes a first liquid crystal panel 221 and a second liquid crystal panel 222 that are oppositely configured, and a polarization adjustment part 223 configured between the two liquid crystal panels.

As shown in FIG. 14, each of the first liquid crystal panel 221 and the second liquid crystal panel 222 includes an array substrate 011 and a color film substrate 012. In a same liquid crystal panel, the array substrate 011 includes a light-transmitting area 10 and a light-blocking area 20. The color film substrate 012 is configured oppositely to the light-transmitting area 10. A fixing area is provided on a side surface of the light-blocking area 20 facing the color filter substrate 012 and is configured to fix control chips IC.

The color film substrate 012 of the first liquid crystal panel 221 is configured oppositely to the color film substrate 012 of the second liquid crystal panel 222, and the control chip IC of the first liquid crystal panel 221 and the control chip IC of the second liquid crystal panel 222 are not configured in overlapping positions. Since the thickness of the control chip IC is relative thick, the control chips IC of the two liquid crystal panels need to be configured in non-overlapping positions to prevent the problem of having a large thickness of SLM by configuring oppositely.

As shown in FIG. 14, a polarizer 224 is attached and fixed to a side surface of the array substrate 011 of the second liquid crystal panel 222 away from the first liquid crystal panel 221 to implement the amplitude modulation. The light-blocking areas 20 of the two liquid crystal panels are configured with flexible printed circuits (FPC) to connect the control chips IC with external electric circuits. Thickness of the color film substrate 012 and the array substrate 011 can be set based on requirements, for example the thickness of the array substrate 011 can be set to 0.5 mm, and the thickness of the color film substrate 012 can be set to 0.15 mm.

As shown in FIG. 14, the polarization adjustment part 223 is a liquid crystal wave plate. The color film substrate 012 directly formed at the second liquid crystal panel 222 is attached and fixed to the color film substrate 012 of the first liquid crystal panel 221 by using an optical adhesive layer 014. An implementation method of the polarization adjustment part 223 is not limited to the method shown in FIG. 14 and can be any implementation method of the above-mentioned embodiments.

In the technical solution of embodiments of the present invention, by configuring the polarization adjustment part 223 between the first liquid crystal panel 221 and the second liquid crystal panel 222, the SLM can implement the phase modulation and the amplitude modulation to the incident linear-polarized light, while the alignment directions of the two liquid crystal panels are parallel. The formation process of the SLM is simplified, and the difficulties in designing and forming the SLM are reduced.

Figure 15:
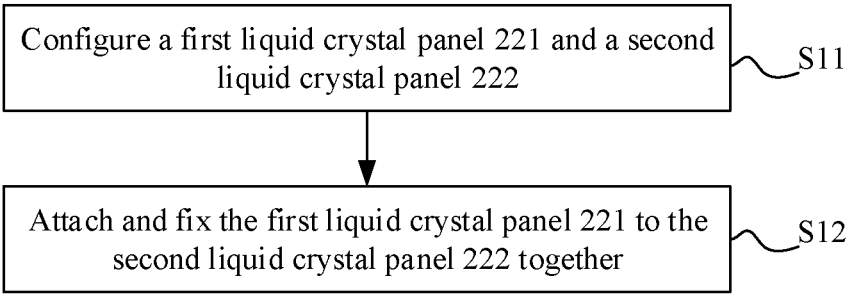
FIG. 15 illustrates a schematic flowchart of a method of forming an exemplary SLM according to some embodiments of the present disclosure.

Based on the above-mentioned embodiments, another embodiment of the present disclosure provides a method of forming the SLM. FIG. 15 illustrates a schematic flowchart of a method of forming an exemplary SLM according to some embodiments of the present disclosure. The formation method is used to produce the SLM shown in FIG. 3. The method includes following processes.

At S11, a first liquid crystal panel 221 and a second liquid crystal panel 222 are configured.

At S12, the first liquid crystal panel 221 and the second liquid crystal panel 222 are attached and fixed together.

A polarization adjustment part 223 between the first liquid crystal panel 221 and the second liquid crystal panel 222. The alignment directions of the first liquid crystal panel 221 and the second liquid crystal panel 222 are parallel. The first liquid crystal panel 221 is configured to perform a phase modulation on incident linear-polarized light. The polarization adjustment part 223 cause a polarization direction of the linear-polarized light exited from the first liquid crystal panel 221 to rotate a preset angle but maintain a linear polarization state. The second liquid crystal panel 222 is configured to adjust a polarization state of the linear-polarized light exited from the polarization adjustment part 223 to adjust amplitude of exited light.

The method implements a purpose of producing the SLM by using the two liquid crystal panels with parallel alignment directions through the polarization adjustment part 223. The formation process is simplified, and the cost is reduced.

The polarization adjustment part 223 is a half-wave plate. An angle of 22.5° is formed between the optical axis of the half-wave plate and a polarization direction of the linear-polarized light exited from the first liquid crystal panel 221. The polarization adjustment part 223 is configured to rotate, by 45°, the polarization direction of the linear-polarized light exited from the first liquid crystal panel 221.

Figure 16:
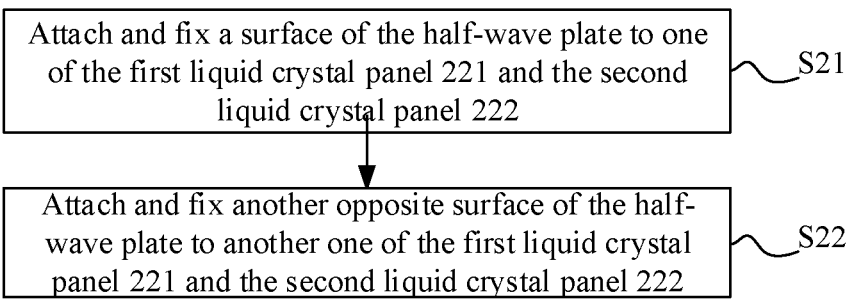
FIG. 16 illustrates a flowchart of an exemplary liquid crystal panel attaching and fixing method according to some embodiments of the present disclosure.

The half-wave plate may have a structure as shown in FIG. 4, which at least includes a substrate material layer 31 and a polarizing film 32 of a half wavelength. A method to fit and fix the first liquid crystal panel 221 and the second liquid crystal panel 222 is as shown in FIG. 16. FIG. 16 illustrates a schematic flowchart of an exemplary liquid crystal panel attaching and fixing method according to some embodiments of the present disclosure. The method includes following processes.

At S21, a surface of the half-wave plate is attached and fixed to one of the first liquid crystal panel 221 and the second liquid crystal panel 222.

At S22, another surface of the half-wave plate is attached and fixed to another one of the first liquid crystal panel 221 and the second liquid crystal panel 222.

The method attaches and fixes the separately prepared half-wave plate to the two liquid crystal panels with the parallel alignment directions to prepare the SLM. The formation process is simplified, and the cost is reduced.

Figure 17:
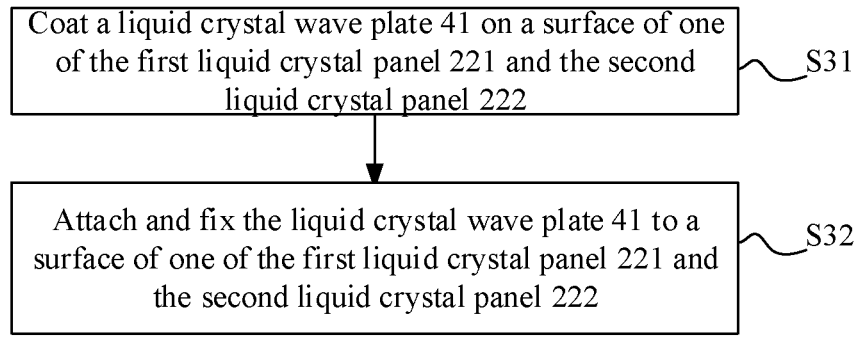
FIG. 17 illustrates a flowchart of another exemplary liquid crystal panel attaching and fixing method according to some embodiments of the present disclosure.

The half-wave plate is a liquid crystal wave plate. In some embodiments, a method to fit and fix the first liquid crystal panel 221 and the second liquid crystal panel 222 is as shown in FIG. 17. FIG. 17 illustrates a schematic flowchart of another exemplary liquid crystal panel fixing method according to some embodiments of the present disclosure. The method can form the SLM as shown in FIG. 5 and FIG. 6 and includes following processes.

At S31, a liquid crystal wave plate 41 is coated on a surface of one of the first liquid crystal panel 221 and the second liquid crystal panel 222.

At S32, the liquid crystal wave plate 41 is attached and fixed to a surface of one of the first liquid crystal panel 221 and the second liquid crystal panel 222. For example, an optical adhesive layer 42 can be used to attach and fix.

The method uses directly the first liquid crystal panel 221 or the second liquid crystal 222 as a substrate of the liquid crystal wave plate 41 without requiring a separate substrate to produce the liquid crystal wave plate 41. A prepared and formed SLM is thin. The formation process of the liquid crystal wave plate 41 is integrated in the attaching and fixing process, which simplifies the formation process.

The polarization adjustment part 223 includes a first quarter-wave plate 2231 and a second quarter-wave plate 2232. The first quarter-wave plate 2231 and the second quarter-wave plate 2232 function together to rotate the polarization direction of the linear-polarized light exited from the first liquid crystal panel 221 by 45°.

Figure 18:
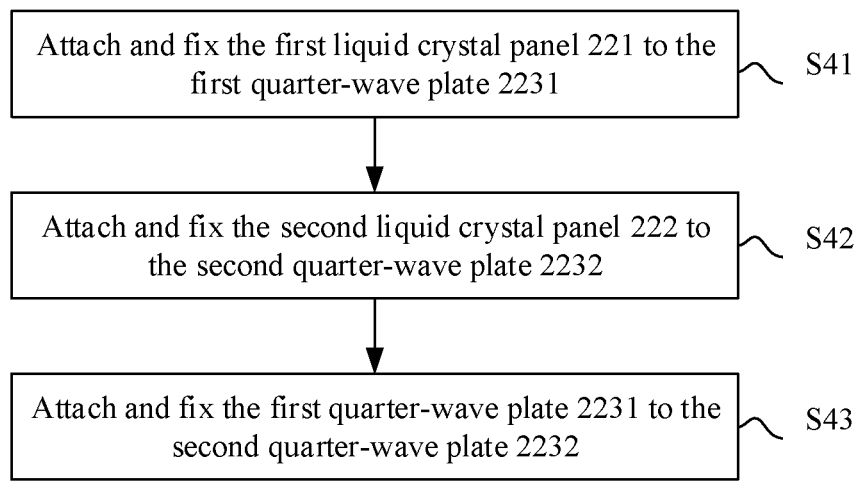
FIG. 18. illustrates a flowchart of another exemplary liquid crystal panel attaching and fixing method according to some embodiments of the present disclosure.

As shown in FIG. 7, the first quarter-wave plate 2231 includes a first polarizing film 52 and a first substrate 51, and the second quarter-wave plate 2232 includes a second polarizing film 54 and a second substrate 53. A method to fit and fix the first liquid crystal panel 221 and the second liquid crystal panel 222 is as shown in FIG. 18. FIG. 18 illustrates a schematic flowchart of another exemplary liquid crystal panel fixing method according to some embodiments of the present disclosure. The method includes following processes.

At S41, the first liquid crystal panel 221 is attached and fixed to the first quarter-wave plate 2231.

At S42, the second liquid crystal panel 222 is attached and fixed to the second quarter-wave plate 2232.

At S43, the first quarter-wave plate 2231 is attached and fixed to the second quarter-wave plate 2232.

The method can prepare the two quarter-wave plates separately. One of the liquid crystal panels attaches and fixes each of the quarter-wave plates and the two quarter-wave plates attaches and fixes oppositely to implement a same light modulation effect as the half-wave plate. The two liquid crystal panels with the parallel alignment directions can be used to produce the SLM to simplify the formation process of the SLM. In some embodiments, the two quarter-wave plates may be attached and fixed at first and then are attached and fixed to the first liquid crystal panel 221 and the second liquid crystal panel 222, respectively.

Figure 19:
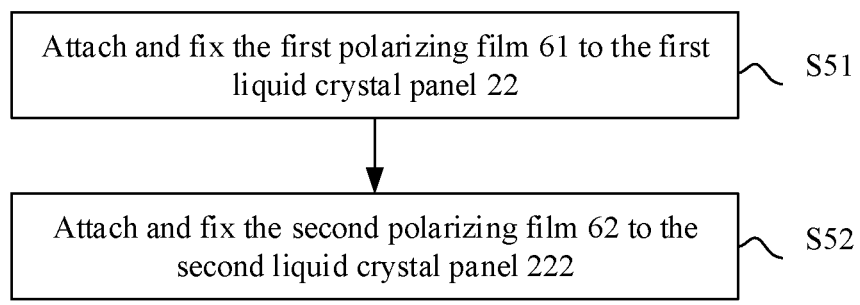
FIG. 19 illustrates a flowchart of another exemplary liquid crystal panel attaching and fixing method according to some embodiments of the present disclosure.

As shown in FIG. 8, the first quarter-wave plate 2231 includes a first polarizing film 61, and the second quarter-wave plate 2232 includes a second polarizing film 62. The first polarizing film 61 and the second polarizing film 62 are located at two opposite surfaces of a same substrate 63. A method to fit and fix the first liquid crystal panel 221 and the second liquid crystal panel 222 is as shown in FIG. 19. FIG. 19 illustrates a schematic flowchart of another exemplary liquid crystal panel fixing method according to some embodiments of the present disclosure. The method includes following processes.

At S51, the first polarizing film 61 is attached and fixed to the first liquid crystal panel 221.

At S52, the second polarizing film 62 is attached and fixed to the second liquid crystal panel 222.

The method can use the same substrate 63 to prepare two integrated quarter-wave plates, and then attaches and fixes the two integrated quarter-wave plates to the two liquid crystal panels with the parallel alignment directions. The same light modulation effect as the half-wave plate can be implemented. The two liquid crystal panels with the parallel alignment directions are used to produce the SLM, which simplifies the formation process of the SLM.

Figure 20:
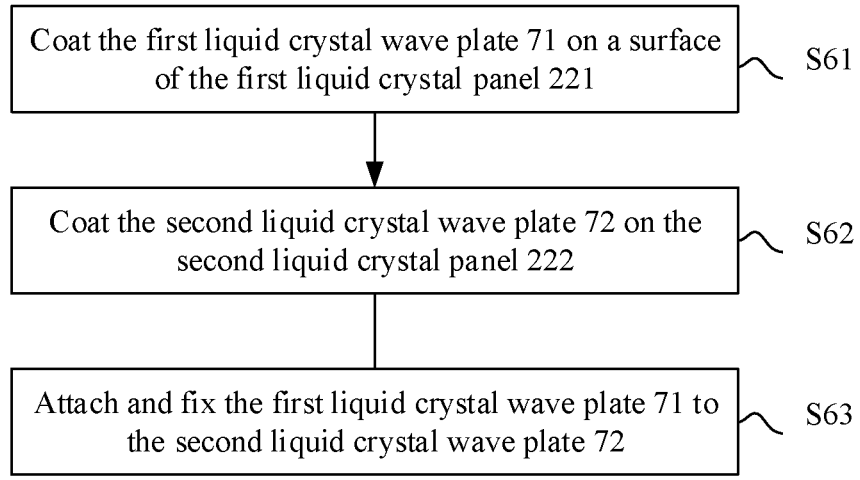
FIG. 20 illustrates a flowchart of another exemplary liquid crystal panel attaching and fixing method according to some embodiments of the present disclosure.

As shown in FIG. 9, the first quarter-wave plate 2231 is a first liquid crystal wave plate 71, and the second quarter-wave plate 2232 is a second liquid crystal wave plate 72. A method to fit and fix the first liquid crystal panel 221 and the second liquid crystal panel 222 is shown in FIG. 20. FIG. 20 illustrates a schematic flowchart of another exemplary liquid crystal panel fixing method according to some embodiments of the present disclosure. The method includes following processes.

At S61, the first liquid crystal wave plate 71 is coated on a surface of the first liquid crystal panel 221.

At S62, the second liquid crystal wave plate 72 is coated on a surface of the second liquid crystal panel 222.

At S63, the first liquid crystal wave plate 71 is attached and fixed to the second liquid crystal wave plate 72.

The method can use directly the two liquid crystal panels as the substrates to prepare the first liquid crystal wave plate 71 and the second liquid crystal wave plate 72, and then attaches and fixes the two liquid crystal wave plate. The same light modulation effect as the half-wave plate can be implemented. The two liquid crystal panels with the parallel alignment directions are used to produce the SLM, which simplifies the formation process of the SLM.

In some embodiments, the method for forming the SLM further includes, as shown in FIG. 10, configuring a polarizer 224 at a side of the second liquid crystal panel 222 away from the first liquid crystal panel 221. The polarizer 224 is configured to adjust an intensity of the light exited from the SLM based on the light exited from the second liquid crystal panel 222. A modulation of the circularly polarized light of different polarization states exited by the SLM based on the polarizer 224 can implement an amplitude modulation.

The linear-polarized light is coherent RGB tri-color light exited from a light source device sequentially. An adjustment wave band of the polarization adjustment part 223 covers at least a wave band of the RGB tri-color light to facilitate a phase modulation and an amplitude modulation of tri-color backlight, separately.

In some embodiments, as shown in FIG. 11 to FIG. 13, each of the first liquid crystal panel 221 and the second liquid crystal panel 222 includes a first electrode 84, a first alignment layer 81, a liquid crystal layer 83, a second alignment layer 82, and a second layer electrode 85, sequentially stacked over each other. In a same liquid crystal panel, alignment directions of the first alignment layer 81 and the second alignment layer 82 are antiparallel to each other and parallel to a first direction Y. The first electrode 84 and the second electrode 85 form an electric field perpendicular to the liquid crystal panel. A direction of the electric field is a second direction X. The first direction Y and the second direction X intersect perpendicularly and are located at a same plane XY. The plane XY is an inversion plane of liquid crystal molecules in the liquid crystal panel.

In embodiments of the present disclosure, the formation method can manufacture the SLM described in the above embodiments and use the two liquid crystal panels with the parallel alignment directions to produce the SLM, which simplifies the formation process of the SLM.

Figure 21:
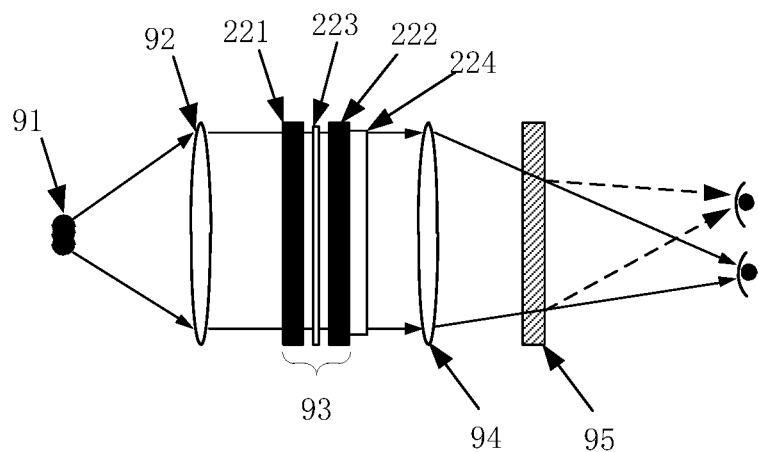
FIG. 21 illustrates a schematic structural diagram of an exemplary holographic 3D display apparatus according to some embodiments of the present disclosure.

Based on the above-mentioned embodiments, another embodiment of the present disclosure also provides a holographic 3D display apparatus. FIG. 21 illustrates a schematic structural diagram of an exemplary holographic 3D display apparatus according to some embodiments of the present disclosure. The holographic 3D display apparatus includes following elements.

A light source device 91 is configured to exit coherent RGB tri-color light sequentially.

A beam expansion and collimation assembly 92 is configured to perform expansion and collimation on the light exited from the light source device 91.

An SLM 93 is configured to perform a phase modulation and an amplitude modulation on the light exited from the beam expansion and collimation assembly 92. The SLM 93 is the SLM according to any method of the above-mentioned embodiments, which includes a first liquid crystal panel 221, a polarization adjustment part 223, and a second liquid crystal panel 222, sequentially stacked over each other.

A field lens 94 and a liquid crystal grating 95, the field lens 94 is at least configured to increase ability of boundary light of the light exited from the SLM incident on the liquid crystal gratings 95, and the liquid crystal gratings 95 are configured to form a left eye image and a right eye image based on incident light.

In the method shown in FIG. 21, the polarizer 224 is configured at a light-output side surface of the second liquid crystal panel 222. In other methods, the polarizer 224 may be integrated at a surface of the field lens 94 or the liquid crystal gratings 95.

In embodiments of the present disclosure, the holographic 3D display apparatus adopts the SLM described in the above embodiments. The SLM uses the two liquid crystal panels with the parallel alignment directions to implement the phase modulation and the amplitude modulation of the linear-polarized light. The formation process of the SLM is simplified, such that the formation process of the holographic 3D display apparatus is simplified.

Embodiments in this specification are described in a progressive, side-by-side, or progression and side-by-side combined manner. Each embodiment focuses differently from other embodiments. Same and similar parts between the embodiments refer to each other. For the formation method and the holographic 3D display apparatus disclosed in the embodiments, since the method and device correspond to the SLM disclosed in the embodiments, the description is relatively simple, and the relevant parts are made referred to the description corresponding to the SLM.

In the present disclosure, relational terms such as first and second are only used to distinguish one entity or operation from another entity or operation, and do not necessarily require or imply these entities or operations having any such actual relationship or order among them. The terms "including," "containing," or any other variations thereof are intended to encompass non-exclusive inclusion, such that an item or device that includes a series of elements includes not only those elements, but also other elements that are not explicitly listed, or may include elements inherent to such an item or device. Without more restrictions, the elements defined by the sentence "include a . . . " do not exclude the existence of other identical elements in the item or device, which include the above elements.

The above description of the disclosed embodiments enables those skilled in the art to implement or use the present disclosure. Various modifications to these embodiments will be apparent to those skilled in the art. The general principles defined herein may be implemented in other embodiments without departing from the spirit or scope of the disclosure. Therefore, the present disclosure will not be limited to the embodiments shown in the present specification but shall conform to the widest scope consistent with the principles and novel features disclosed in the present specification.

What is claimed is:

1. A spatial light modulator (SLM), comprising:
a first liquid crystal panel and a second liquid crystal panel that are oppositely configured, and a polarization adjustment part configured between the first liquid crystal panel and the second liquid crystal panel, wherein:
an alignment direction of the first liquid crystal panel is parallel to an alignment direction of the second liquid crystal panel;
the first liquid crystal panel is configured to perform a phase modulation on incident linear-polarized light;
the polarization adjustment part is configured to rotate, by a preset angle, a polarization direction of linear-polarized light exited from the first liquid crystal panel; and
the second liquid crystal panel is configured to have an alignment direction paralleled to an alignment direction of the first liquid crystal panel and an alignment direction of the incident linear-polarized light to adjust a polarization state of linear-polarized light exited from the polarization adjustment part to adjust an amplitude of exited light.

2. The SLM of claim 1, wherein the polarization adjustment part is a half wave plate, and an optical axis direction of the half-wave plate and the polarization direction of the linear-polarized light exited from the first liquid crystal panel form an angle of 22.5° to cause the polarization direction of the linear-polarized light exited from the first liquid crystal panel to rotate by 45°.

3. The SLM of claim 2, wherein the half-wave plate at least comprises a substrate material layer and a polarizing film, wherein two opposite surfaces of the half-wave plate are attached and fixed to the first liquid crystal panel and the second liquid crystal panel, respectively.

4. The SLM of claim 2, wherein:
the half-wave plate is a liquid crystal wave plate; and
the liquid crystal wave plate is coated on the first liquid crystal panel, and attached and fixed to the second liquid crystal panel; or
the liquid crystal wave plate is coated on the second liquid crystal panel, and attached and fixed to the first liquid crystal panel.

5. The SLM of claim 1, wherein:
the polarization adjustment part includes a first quarter-wave plate and a second quarter-wave plate; and
the first quarter-wave plate and the second quarter-wave plate function together to rotate the polarization direction of the linear-polarized light exited from the first liquid crystal panel by 45°.

6. The SLM of claim 5, wherein:
the first quarter-wave plate includes a first polarizing film and a first substrate material layer, the second quarter-wave plate includes a second polarizing film and a second substrate material layer, and the first quarter-wave plate and the second quarter-wave plate are attached and fixed oppositely; or
the first quarter-wave plate includes a first polarizing film, the second quarter-wave plate includes a second polarizing film, and the first polarizing film and the second polarizing film are respectively located at two opposite surfaces of a same substrate.

7. The SLM of claim 5, wherein the first quarter-wave plate is a first liquid crystal wave plate, and the second quarter-wave plate is a second liquid crystal wave plate, wherein:
the first liquid crystal wave plate is coated on the first liquid crystal panel;
the second liquid crystal wave plate is coated on the second liquid crystal panel; and
the first liquid crystal wave plate and the second liquid crystal wave plate are attached and fixed oppositely.

8. The SLM of claim 1, wherein a polarizer is provided at a side of the second liquid crystal panel away from the first liquid crystal panel, and the polarizer is configured to adjust an intensity of light exited from the SLM based on light exited from the second liquid crystal panel.

9. The SLM of claim 1, wherein the linear-polarized light is coherent RGB tri-color light exited from a light source device in time sequence, and an adjustment wave band of the polarization adjustment part at least covers a wave band of the RGB tri-color light.

10. The SLM of claim 1, wherein:
each of the first liquid crystal panel and the second liquid crystal panel includes a first alignment layer, a liquid crystal layer, and a second alignment layer, sequentially stacked over each other; and
in a same liquid crystal panel, the alignment directions of the first alignment layer and the second alignment layer are antiparallel to each other and are parallel to a first direction.

11. The SLM of claim 10, wherein the same liquid crystal panel further comprising:
a first electrode and a second electrode that are oppositely configured, wherein:
the first electrode, the first alignment layer, the liquid crystal layer, the second alignment layer, and the second electrode are sequentially stacked over each other; and
the first electrode and the second electrode are configured to form an electric field perpendicular to the liquid crystal layer;
the electric field is along a second direction; and
an inversion plane of liquid crystal molecules of the liquid crystal layer is parallel to the first direction and the second direction.

12. The SLM of claim 1, wherein:
each of the first liquid crystal panel and the second liquid crystal panel includes an array substrate and a color film substrate;
in a same liquid crystal panel, the array substrate includes a light transmission area and a light blocking area, the color film substrate is configured oppositely to the light transmission area, and a fixing area is configured at a side surface of the light blocking area facing the color film substrate to fix control chips IC; and the color film substrate of the first liquid crystal panel is configured oppositely to the color film substrate of the second liquid crystal panel, and the control chips IC of the first liquid crystal panel and the control chips IC of the second liquid crystal panel are not configured in overlapping positions.

13. A method of forming a spatial light modulator (SLM), comprising:

providing a first liquid crystal panel and a second liquid crystal panel; and attaching and fixing the first liquid crystal panel to the second liquid crystal panel, wherein:

a polarization adjustment part is configured between the first liquid crystal panel and the second liquid crystal panel;

an alignment direction of the first liquid crystal panel is parallel to an alignment direction of the second liquid crystal panel;

the first liquid crystal panel is configured to perform a phase modulation on incident linear-polarized light;

the polarization adjustment part is configured to rotate, by a preset angle, a polarization direction of linear-polarized light exited from the first liquid crystal panel; and the second liquid crystal panel is configured to have an alignment direction paralleled to an alignment direction of the first liquid crystal panel and an alignment direction of the incident linear-polarized light to adjust a polarization state of linear-polarized light exited from the polarization adjustment part to adjust an amplitude of exited light.

14. The method of claim 13, wherein:

the polarization adjustment part is a half-wave plate;

an optical axis direction of the half-wave plate and a polarization direction of the linear-polarized light exited from the first liquid crystal panel form an angle 22.5°;

the polarization adjustment part is configured to rotate, by 45°, the polarization direction of the linear-polarized light exited from the first liquid crystal panel;

the half-wave plate at least includes a substrate material layer and a polarizing film with a half wavelength; and attaching and fixing the first liquid crystal panel to the second liquid crystal panel includes:

attaching and fixing a surface of the half-wave plate to one of the first liquid crystal panel and the second liquid crystal panel; and attaching and fixing another surface of the half-wave plate to another one of the first liquid crystal panel and the second liquid crystal panel.

15. The method of claim 13, wherein:

the polarization adjustment part is a half-wave plate;

an optical axis direction of the half-wave plate and a polarization direction of the linear-polarized light exited from the first liquid crystal panel form an angle 22.5°;

the polarization adjustment part is configured to rotate the polarization direction of the linear-polarized light exited from the first liquid crystal panel by 45°;

the half-wave plate is a liquid crystal wave plate; and attaching and fixing the first liquid crystal panel to the second liquid crystal panel includes:

coating the liquid crystal wave plate on a surface of one of the first liquid crystal panel and the second liquid crystal panel; and attaching and fixing the liquid crystal wave plate to a surface of another one of the first liquid crystal panel and the second liquid crystal panel.

16. The method of claim 13, wherein:

the polarization adjustment part includes a first quarter-wave plate and a second quarter-wave plate;

the first quarter-wave plate and the second quarter-wave plate function together to rotate a polarization direction of linear-polarized light exited from the first liquid crystal panel by 45°; and the first quarter-wave plate includes a first polarizing film and a first substrate material layer, and the second quarter-wave plate includes a second polarizing film and a second substrate material layer; and attaching and fixing the first liquid crystal panel and the second liquid crystal panel oppositely include:

attaching and fixing the first liquid crystal panel to the first quarter-wave plate, attaching and fixing the second liquid crystal panel to the second quarter-wave plate, and attaching and fixing the first quarter-wave plate to the second quarter-wave plate; or the first quarter-wave plate includes a first polarizing film, the second quarter-wave plate includes a second polarizing film, the first polarizing film and the second polarizing film are configured on two opposite surfaces of a same substrate, and attaching and fixing the first liquid crystal panel to the second liquid crystal panel includes:

attaching and fixing the first polarizing film to the first liquid crystal panel; and attaching and fixing the second polarizing film to the second liquid crystal panel.

17. The method of claim 13, wherein:

the polarization adjustment part includes a first quarter-wave plate and a second quarter-wave plate;

the first quarter-wave plate and the second quarter-wave plate function together to rotate a polarization direction of linear-polarized light exited from the first liquid crystal panel by 45°;

the first quarter-wave plate is a first liquid crystal wave plate, and the second quarter-wave plate is a second liquid crystal wave plate; and attaching and fixing the first liquid crystal panel to the second liquid crystal panel includes:

coating the first liquid crystal wave plate on a surface of the first liquid crystal panel;

coating the second liquid crystal wave plate on a surface of the second liquid crystal panel; and attaching and fixing the first liquid crystal wave plate to the second liquid crystal wave plate.

18. The method of claim 13, further including:

configuring a polarizer at a side of the second liquid crystal panel away from the first liquid crystal panel; and adjusting, by the polarizer, an intensity of light exited from the SLM based on light exited from the second liquid crystal panel.

19. The method of claim 13, wherein:

each of the first liquid crystal panel and the second liquid crystal panel includes a first electrode, a first alignment layer, a liquid crystal layer, a second alignment layer, and a second electrode, sequentially stacked over each other; and in a same liquid crystal panel, the alignment directions of the first alignment layer and the second alignment layer are antiparallel to each other and are parallel to a first direction;

the first electrode and the second electrode form an electric field perpendicular to the liquid crystal panel, and an electric field direction is a second direction; and the first direction and the second direction intersect perpendicularly at a same plane, which is an inversion plane of liquid crystal molecules of the liquid crystal panel.

20. A holographic 3D display apparatus, comprising:

a light source device, configured to sequentially exit coherent RGB tri-color light;

a beam expansion and collimation assembly, configured to perform expansion and collimation on light exited from the light source device;

a spatial light modulator (SLM), configured to perform a phase modulation and an amplitude modulation on light exited from the beam expansion and collimation assembly, wherein the SLM includes:

a first liquid crystal panel and a second liquid crystal panel that are oppositely configured, and a polarization adjustment part configured between the first liquid crystal panel and the second liquid crystal panel, wherein:

an alignment direction of the first liquid crystal panel is parallel to an alignment direction of the second liquid crystal panel;

the first liquid crystal panel is configured to perform a phase modulation on incident linear-polarized light;

the polarization adjustment part is configured to rotate, by a preset angle, a polarization direction of linear-polarized light exited from the first liquid crystal panel; and the second liquid crystal panel is configured to have an alignment direction paralleled to an alignment direction of the first liquid crystal panel and an alignment direction of the incident linear-polarized light to adjust a polarization state of linear-polarized light exited from the polarization adjustment part to adjust an amplitude of exited light; and a field lens and a liquid crystal grating, wherein the field lens is at least configured to increase an ability of boundary light of light exited from the SLM incident on the liquid crystal gratings, and the liquid crystal grating is configured to form a left eye image and a right eye image based on the incident light.

* * * * *